May 13, 1952    R. DUGDALE    2,596,766
LINE DRIER REEL
Filed Oct. 30, 1947    2 SHEETS—SHEET 1
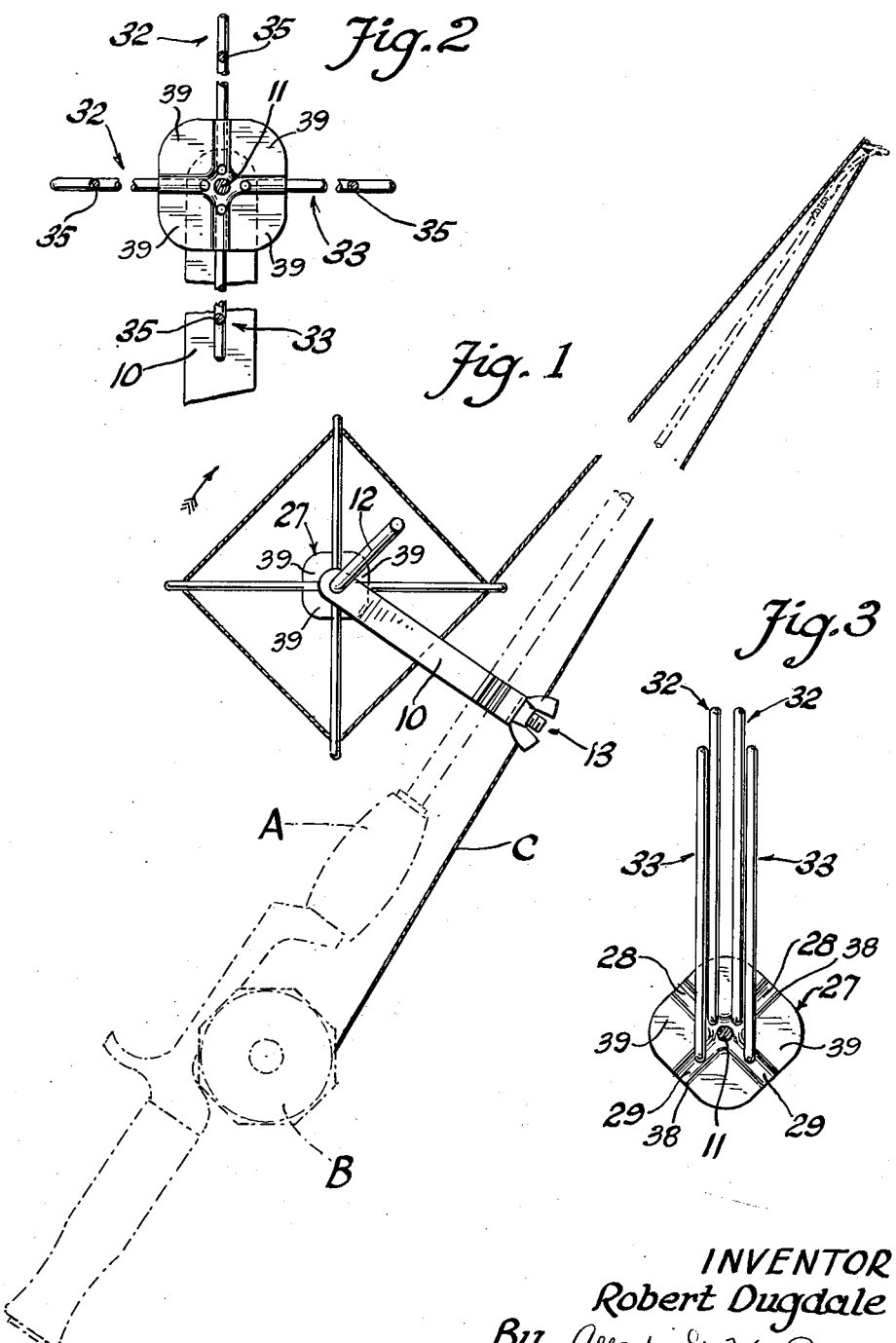
INVENTOR
Robert Dugdale
By Albert V. McCaleb
Attorney May 13, 1952 R. DUGDALE 2,596,766
LINE DRIER REEL
Filed Oct. 30, 1947 2 SHEETS—SHEET 2
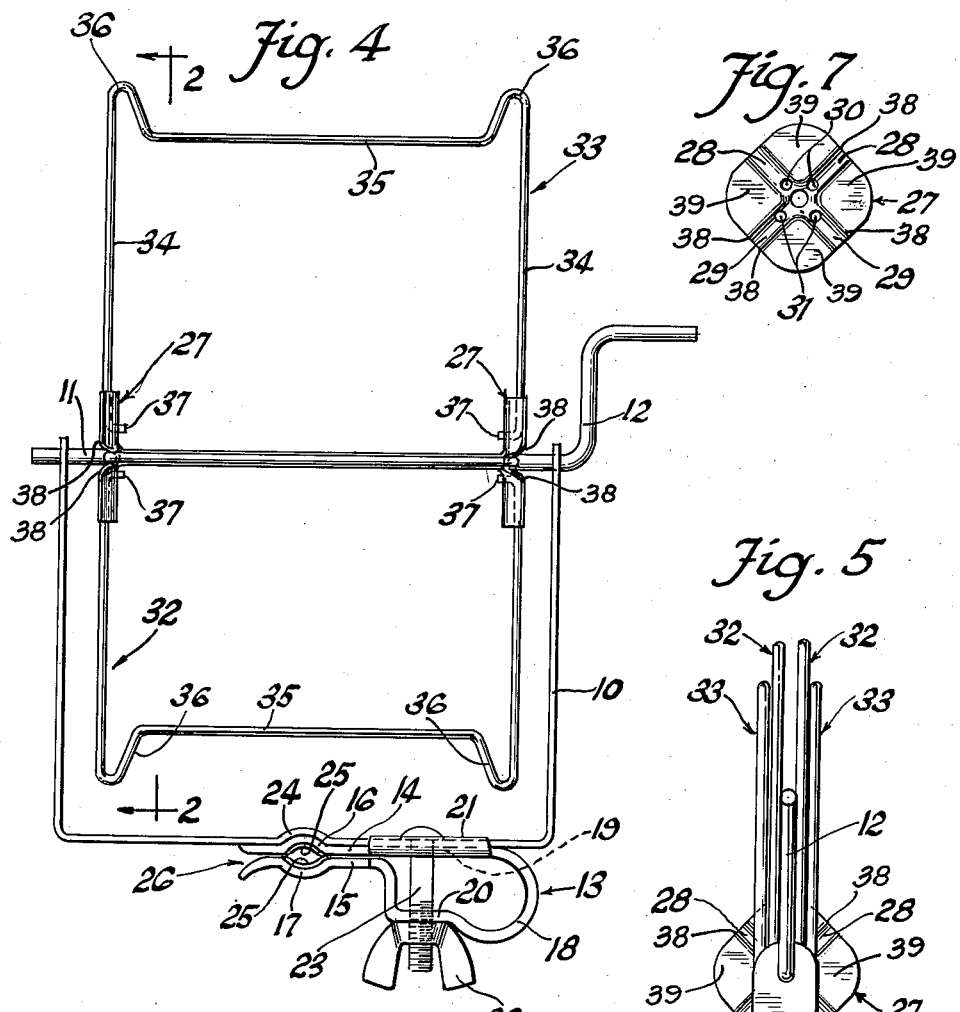
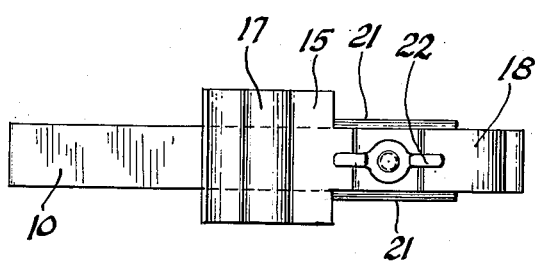
INVENTOR
Robert Dugdale
By Albert L. McCaleb
Attorney Patented May 13, 1952

2,596,766

UNITED STATES PATENT OFFICE 2,596,766

LINE DRIER REEL

Robert Dugdale, Chicago, Ill.

Application October 30, 1947, Serial No. 782,991

2 Claims. (Cl. 242—104)

My invention contemplates and provides a superior reel of simple, light weight and sturdy construction, capable of being economically manufactured, which readily may be applied to a fishing rod, or a section thereof, for manipulation thereon and therewith to receive and so hold a damp fish line that it will dry quickly and thoroughly preparatory to being wound or re-wound upon a fishing reel with which it is to be associated in further service.

An object of my invention is to provide a line drier reel which, although of ample size when in use, is capable of being readily collapsed to occupy very little space, to facilitate packaging or placement in a tackle box, and is just as readily restored to its non-collapsed or operative condition.

A salient feature of the line drier reel of my invention is the hereinafter described novel manner in which two pairs of line carriers are eccentrically and differentially pivoted to certain hub plates which afford radial grooves into which the legs of the line carriers are urged and held, preferably by the inherent resiliency of such line carriers, when the reel of my invention is in its non-collapsed or operative condition.

In the accompanying two sheets of drawings illustrating my invention:

Fig. 1 is a side elevational view of my line drier reel as it appears when operatively associated with a fishing rod;

Fig. 2 is a view partly in section and partly in elevation, in which certain parts are shown broken away to conserve space in illustration, which may be regarded as taken in the plane of the line 2—2 of Fig. 4;

Fig. 3 is a detail view, partly in section and partly in elevation, looking at the outer face of one of the hub plates and depicting the positions taken, with respect to that hub plate, by the contiguous line carrier legs when the line drier reel is in its collapsed condition;

Fig. 4 is a rear elevational view of my line drier reel when in its operative condition but not associated with a rod;

Fig. 5 is a fragmentary side elevational view illustrating the depicted parts as they appear at an intermediate stage in the conversion of my line drier reel from its operative condition to its collapsed condition or vice-versa;

Fig. 6 is a bottom plan view of the frame of my line drier reel; and

Fig. 7 is an isolated elevational view of the outer face of one of the hub plates.

Similar characters of reference refer to similar parts throughout the several views.

In Fig. 1, A indicates a rod provided with a casting reel B equipped with a line C.

The line drier reel of my invention comprises a preferably U-shaped frame member 10 suitably formed of metal strap. The parallel legs of this frame member are provided near their unconnected extremities with circular through apertures for the reception of a rotatable shaft 11 provided with a crank 12. Any conventional or other suitable means (not shown) desirably is provided to prevent axial movement of the shaft 11 in frame member 10 when the line drier reel is in use.

A clamp for mounting frame member 10 upon the shaft (or shaft section) of rod A is indicated as a whole at 13. This clamp desirably comprises one piece of metal conformed to provide: a pair of jaws 14 and 15 beaded at 16 and 17 to afford opposed channels for the reception of the rod shaft; a loop 18 which connects jaws 14 and 15 and presents spaced-apart substantially parallel portions 19 and 20; and flanges 21—21 carried by the portion 19 and embracing the lower or leg-connecting portion of U-shaped frame member 10. The clamp also desirably comprises a wing nut 22 cooperating with a bolt 23 extending through registering apertures in the clamp portions 19 and 20 as well as the lower or leg-connecting portion of frame member 10. Such last-mentioned portion of the frame member desirably is beaded at 24 to provide a channel for the reception of jaw bead 16. The opposed jaw channels preferably are aligned with a suitable soft material 25 to prevent injury to the rod shaft when the clamp is tightened thereon. The lips of jaws 14 and 15 preferably diverge as indicated at 26.

Secured upon shaft 11 are spaced-apart hub plates 27—27. Each of such hub plates is provided with a cruciform bead in order to stiffen it and to provide it on its outer face, i. e., its face which is presented away from the other hub plate, with four radial channels; 28—28 and 29—29; such channels being disposed 90 degrees apart.

It should be noted that crank 12 occupies a radial plane midway between the two radial planes which include the channels 28—28 of the hub plates 27—27 (see Fig. 5).

At 32—32 and 33—33 are indicated four line carriers which radiate from the hub plates 27—27. Each of these line carriers consists of a single piece of sufficiently stiff spring wire bent to provide the parallel leg portions 34—34, the line seat portion 35, and the return bent portions 36—36 which connect the leg portions 34—34 with the line seat portion 35 and also constitute slightly diverging abutments which serve to prevent the escape, endwise of the line seat portion 35, of line wound upon the drier reel. Each of the line carrier leg portions 34—34 has its inner extremity bent at right angles towards the corresponding extremity of the other of said leg portions, to provide a toe 37.

The leg portions 34—34 of the line carriers 32—32 occupy the channels 28—28 of the hub plates 27—27, and have their toes 37—37 extending through the apertures 30—30 in the bottoms of said channels. Similarly the leg portions 34—34 of the line carriers 33—33 occupy the channels 29—29 of the hub plates 27—27, and have their toes 37—37 extending through the apertures 31—31 in the bottoms of said channels 29—29. When the drier reel is in its operative or erected condition, depicted in Figs. 1, 2 and 4, the inherent resilience of each of the line carriers holds its legs and toes in the appropriate channels and apertures of the hub plates.

Referring now to Fig. 1, let us assume that the line C, being wet or damp, is to be dried on the line drier reel which, being in its erected or operative condition, has been secured to the shaft of rod A by clamp 13. The bait-receiving end of the line C is attached to the line seat portion 35 of one of the four line carriers 32—32 and 33—33. Usually such end of the line is provided with a leader which facilitates such attachment. By turning the line drier reel crank 12 and simultaneously oscillating the rod around its longitudinal axis, the line C is wound off the casting reel B and onto the drier reel with successive convolutions of the line so distributed along the line seat portions 35—35 as to facilitate rapid and effective drying of the line. After the line has dried, it is wound back onto the casting reel B, and then the drier reel is usually removed from the rod.

In converting my improved line drier reel from its erected or operative condition to its very compact collapsed condition, which last-mentioned condition greatly facilitates packaging for market as well as the placement of the device in a tackle box, the procedure is as follows: The legs of the line carriers 32—32 are sprung out of the hub plate channels 28—28 without withdrawing the toes 37—37 of those carriers out of the hub plate apertures 30—30. Then such line carriers 32—32 are moved to positions substantially in parallelism with each other and substantially parallel with and immediately adjacent to the radial plane which includes crank 12 and the axis of shaft 11 (see Figs. 3 and 5). Next the legs of the line carriers 33—33 are sprung out of the hub plate channels 29—29 without withdrawing the toes 37—37 of those carriers out of the hub plate apertures 31—31. Then such line carriers 33—33 are positioned substantially in parallelism with each other and parallel with and immediately adjacent to and on opposite sides of the line carriers 32—32. Finally, all of the line carriers are moved into the confines of the U-shaped frame member 10. When this is accomplished, crank 12 lies immediately adjacent to one of the legs of frame member 10. Fig. 5 illustrates the parts as they appear immediately before the line carriers are swung into the embrace of the U-shaped frame member 10.

By reversing the procedure described in the preceding paragraph, my improved line drier reel quickly may be converted from its collapsed condition to its erected or operative condition of Figs. 1, 2 and 4.

Attention is directed to the fact that each of the channels 28—28 and 29—29 faces outwardly of the reel, and that there are definitely curvate shoulders 38—38 where the side walls of each such channels merge with the adjacent segmental plane portions 39—39 of the hub plate 27 in which the channel is formed. This arrangement is very advantageous. In moving each line carrier 32—32 or 33—33 from its position of Figs. 1, 2 and 4 to its position of Figs. 3 and 5, the manipulator of the reel is not required to grasp either leg of the carrier in order to spring that leg out of its channel 28 or 29, as the case may be. All the manipulator has to do, in order to make both legs of any line carrier move simultaneously out of their respective channels, is to hold the hub plates stationary with one hand (as by squeezing the handle 12 and the nearest hub plate between the fingers and thumb of that hand) and then utilizing the other hand to grasp the portion 35 of the carrier intermediate its ends and move it in the proper direction. When the carrier is thus moved relatively to the hub plates 27—27 a curvate shoulder 28 of each channel in which a leg of the carrier is disposed readily cams that leg out of its channel without disengaging either toe 37 of the carrier from its cooperating aperture 30 or 31 as the case may be. This outward camming of the carrier legs is accomplished with practically no effort because of the mechanical advantage realized in moving the carrier by force applied intermediate the ends of its portion 35 as just described.

Having thus exhibited and described a preferred form of my line drier reel, which preferred form I realize may be modified in various respects without departing from the scope of my invention, what I claim as new and desire to secure by Letters Patent of the United States is:

1. In a reel, a rotor comprising a shaft and a pair of spaced-apart sheet metal hubs fixed to the shaft, a plurality of substantially equi-distantly spaced-apart radial channels formed in a face of each of the hubs, the channels of each hub opening outwardly of the reel and away from the other hub, each channel of each hub being substantially aligned with a channel of the other hub, there being a radially extending curvate shoulder where each side wall of each said channel joins a contiguous segmental plane portion of the hub in which the channel is formed, a hub aperture located in each of said channels, the hub apertures in certain of said channels being closer to the rotor axis than are the hub apertures located in other of said channels, and a plurality of generally U-shaped carriers, each carrier being formed of round spring wire and each leg of each carrier being provided with a terminal toe, each carrier squeezing the rotor between its legs and having its toes engaging apertures located in an aligned pair of said channels and being retained radially of the rotor axis when its legs occupy those channels, the two legs of each carrier simultaneously moving out of the channels occupied by those legs by reason of camming cooperation of the round wire of each of such legs with one of the aforementioned curvate shoulders when the carrier is rotated as a whole relatively to the rotor.

2. A reel according to claim 1 wherein the several radial channels of each sheet metal hub are the concave surfaces of a cruciform stiffening rib formed of the sheet metal of the hub and having arms that are concavo-convex in transverse cross section.

ROBERT DUGDALE.

REFERENCES CITED

The following references are of record in the file of this patent:

UNITED STATES PATENTS

| Number | Name | Date |
|---|---|---|
| 967,734 | Darrow | Aug. 16, 1910 |
| 987,411 | Spencer | Mar. 21, 1911 |
| 1,018,550 | Brearey | Feb. 27, 1912 |
| 1,494,725 | Watson et al. | May 20, 1924 |
| 1,966,685 | Rowe | July 17, 1934 |
| 2,282,147 | Quentin et al. | May 5, 1942 |

FOREIGN PATENTS

| Number | Country | Date |
|---|---|---|
| 20,681 of 1901 | Great Britain | Oct. 1, 1892 |